United States Patent

Cowmeadow

[15] 3,643,206
[45] Feb. 15, 1972

[54] DIAPHRAGM SEAL FOR AN ELECTRICAL CONNECTOR

[72] Inventor: Richard R. Cowmeadow, Bramalea, Ontario, Canada

[73] Assignee: The Bunker-Ramo Corporation, Oak Brook, Ill.

[22] Filed: Aug. 21, 1969

[21] Appl. No.: 851,910

[52] U.S. Cl. .................................................339/94 R
[51] Int. Cl. .................................................H01r 13/52
[58] Field of Search ...............................339/59–60, 94

[56] References Cited

UNITED STATES PATENTS 2,881,406  4/1959  Arson ...............................339/59
3,120,987  2/1964  Degnan et al. ....................339/60 M

*Primary Examiner*—Joseph H. McGlynn
*Attorney*—Frederick M. Arbuckle

[57] ABSTRACT

Diaphragm seal for an electrical connector using a material capable of taking a set under compression, the material being used in a manner such that it is effectively subjected only to tensioning, bending and shear to avoid taking a set. In particular, a resilient annular lip is engaged by a rigid annular edge at a point intermediate a root portion and a free edge to urge the free edge into pressure sealing engagement with an annular surface of a member from which the root portion is supported.

9 Claims, 3 Drawing Figures

PATENTED FEB 15 1972  3,643,206

INVENTOR
RICHARD R. COWMEADOW

DIAPHRAGM SEAL FOR AN ELECTRICAL CONNECTOR

This invention relates to a diaphragm seal for an electrical connector and more particularly to a very durable diaphragm seal which will withstand repeated coupling and uncoupling stresses, vibrations, shocks, thermal stresses and other extremes in operating conditions while continuing to provide a highly effective and reliable seal.

Electrical connectors of the prior art have generally used dynamic O-ring and compression butt type rim seals. Both utilize the sealing elastomer under compression loads and with or without temperature extremes, "set" will occur and the seals become ineffective after a period of use.

This invention was evolved with the general object of overcoming the disadvantages of prior art seals and of providing a seal which is very durable and which will withstand extremes in operating conditions while continuing to be highly effective and reliable.

According to this invention, a seal member is provided which is preferably of relatively soft rubber, the term "rubber" being used herein in a generic sense to include natural rubber or any synthetic or other elastomeric materials having properties similar to those of natural rubber. The seal member includes an annular radially extending resilient lip which is engaged by a rigid annular edge at a point intermediate a root portion and a free edge to urge the free edge into pressure sealing engagement with an annular surface of a connector member from which the root portion is supported. With this feature, the lip is subjected to tensioning, shear and bending which it can withstand without taking a set and is not subjected to compression which might cause it to take a set. As a consequence, the seal member can be subjected to repeated coupling and uncoupling stresses, thermal stresses, shocks, vibrations and other extremes in operating conditions and it will continue to provide a highly effective and reliable seal.

In accordance with a specific feature of the invention, the root portion of the annular lip is formed integrally with the periphery of a central portion of the seal member which is sandwiched between faces of a pair of members of the electrical connector. Preferably, contact members carried by the connector members extend through openings in the central portion and are sealingly engaged therewith.

According to another specific feature of the invention, the lip extends angularly from the root portion to the free edge thereof and at an acute angle relative to a generally cylindrical surface portion engaged by the free edge. Preferably, an additional annular surface portion of generally frustoconical shape is provided which is parallel to the lip and on the side of the lip opposite thereof engaged by the rigid annular edge.

The seal member may preferably be supported within a receptacle to be engaged by a rigid annular edge defined by the intersection between an end face of a plug and a generally cylindrical outer surface of the plug.

Another feature is in the provision of an annular slot at the juncture between the root portion of the lip and the periphery of the central portion of the seal member, operative to increase the flexibility of the lip while preventing compression thereof.

A further feature is in the use of the seal in an electrical connector including plug and receptacle members having cylindrical surfaces in loosely fitted telescoping relation, the lip being operative to maintain an effective seal irrespective of relative cocking and scooping of the plug and receptacle members.

This invention contemplates other objects, features and advantages which will become more fully apparent from the following detailed description taken in conjunction with the accompanying drawings which illustrate a preferred embodiment and in which.

Figure 1:
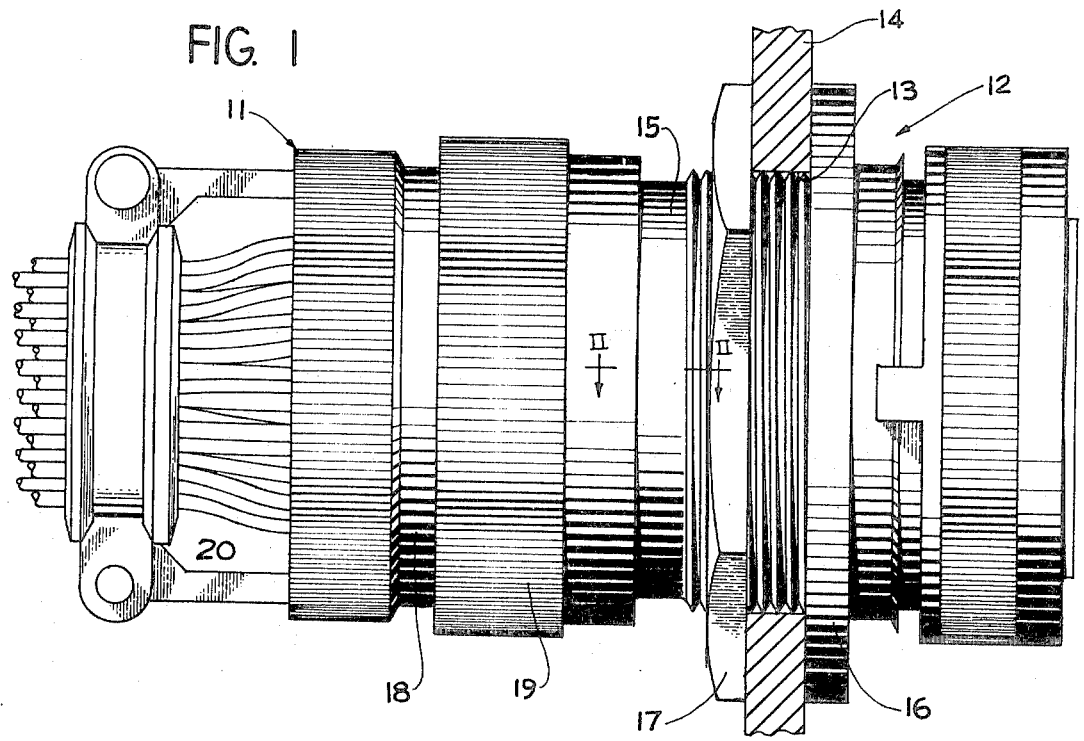
FIG. 1 is a side elevational view of an electrical connector incorporating a diaphragm seal in accordance with the invention.

Reference numeral 10 generally designates an electrical connector incorporating a diaphragm seal constructed in accordance with the principles of this invention. The illustrated connector 10 comprises a plug 11 and a receptacle 12 which is shown mounted in an opening 13 of a panel 14, the receptacle 12 including a shell 15 having an integral annular flange 16 engaging one side of the panel 14 about the opening 13 with a nut 17 being threaded on the outside of the shell 15 into engagement with the other side of the panel 14.

Figure 2:
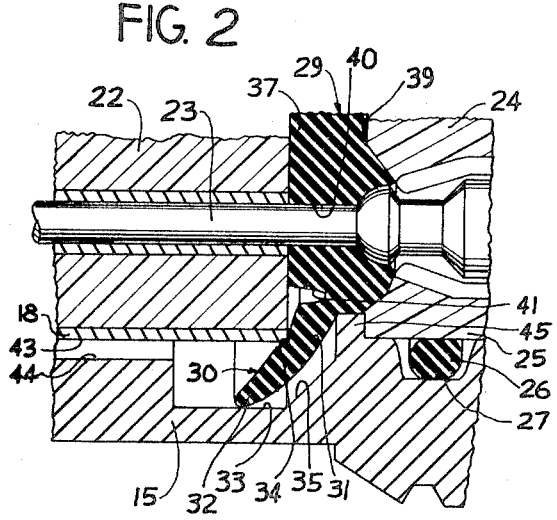
FIG. 2 is a sectional view, on an enlarged scale, taken substantially along line II—II of FIG. 1 and showing the diaphragm seal of this invention.
Figure 3:
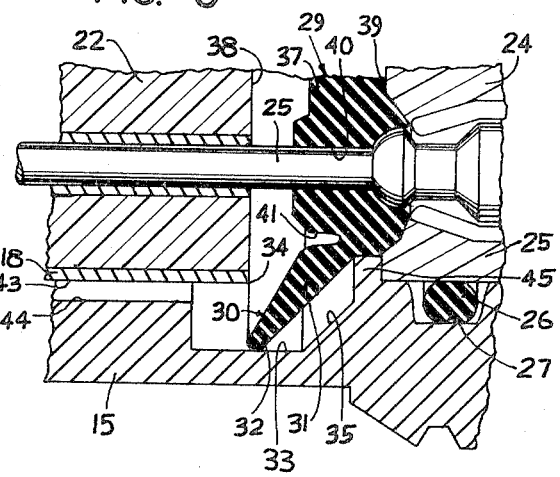
FIG. 3 is a view similar to FIG. 2 but illustrating the condition of the seal before parts are in a fully mated position.

The plug 11 comprises a shell 18 having a portion arranged to extend within the receptacle 15 in telescoping relation thereto, a coupling ring 19 being rotatably mounted on the shell 18 and being arranged upon rotation thereof to move the shell 18 into the shell 15, to the right as viewed in FIG. 1. By way of example, the coupling ring 19 may be formed with internal spiral grooves arranged to receive pins projecting radially outwardly from the left-hand end of the receptacle shell 15. Connecting wires 20 are connected to contacts insulatingly supported within the plug shell 18 which contacts mate with contacts insulatingly supported within the receptacle shell 15. One pair of mating contacts is shown in the sectional views, FIGS. 2 and 3, it being understand that a great many pairs of mating contacts, on the order of 50 or more, may be provided. As shown in FIGS. 2 and 3, a contact 21 in the form of a sleeve is supported within an insulating body 22 within the plug shell 18 and is adapted to receive a pin contact 23 which is supported by an insulating body 24 within the receptacle shell 15. An annular locking insert 25 is shown around one end of the body 24 and an O-ring seal 26 is disposed around the insert 25 and within an annular groove 27 on the inside surface of the receptacle shell 15.

In accordance with this invention, a seal member 29 is provided which includes an annular radially extending resilient lip 30. The lip 30 includes a root portion 31 and an annular free edge 32 engageable with an annular internal cylindrical surface 33 of the receptacle shell 15. The end of the plug shell 18 defines an annular rigid edge 34 which is engageable with the lip 30 at a point approximately midway between the root portion 31 and the free edge 32. When the plug shell 18 and the receptacle shell 15 are connected tightly together, by rotation of the coupling ring 19, the lip 30 is deformed as shown in FIG. 2 and the free edge 32 of the lip 30 is urged into pressure sealing engagement with the cylindrical surface 33. Prior to such deformation, the lip 30 assumes the shape shown in FIG. 3.

The seal member 29 is preferably of a relatively soft rubber material, the term "rubber" being used herein to mean natural rubber or any synthetic or elastomeric material having properties similar to those of natural rubber. With such materials, a highly effective seal can be obtained. However, such materials are subject to taking a "set" when compressed and it is very important to consider that with the illustrated arrangement there is no restriction on the lip 30 to cause it to become compressed substantially and the forces acting thereon are essentially shear, tensioning and bending forces.

The lip 30 preferably extends angularly as shown, most preferably at an angle on the order of 45°, to assume an acute angle relative to the cylindrical surface 33. The receptacle shell 15 may preferably be formed with an annular surface portion 35 of generally frustoconical shape generally parallel to the lip 30 and on the side of the lip 30 which is opposite that engaged by the edge 34 of the plug shell 18. Sufficient clearance is provided between the surface 35 and the lip 30 to prevent the lip 30 from being compressed substantially in the connected position of the plug and receptacle shells, shown in FIG. 2.

The root portion 31 of the lip 30 is formed integrally with a central portion 37 of the seal member 29 which, in the assembled condition of the plug and receptacle shells, is sandwiched between an end face 38 of the insulating body 22 and an end face 39 of the body 24. Openings 40 are provided in the central portion 17 through which the pin contact 23 and other pin contacts of the receptacle extend, with a tight sealing fit. In the assembled condition of the plug and receptacle, the central portion 37 may be compressed to some degree, to insure an effective seal.

To increase the flexibility of the lip 30, an annular slot 41 is formed at the juncture between the root portion 31 and the periphery of the central portion 37.

The plug shell 18 has an outer cylindrical surface 43 in telescoping relation within an internal cylindrical surface 44 of the receptacle shell 15 and with desired manufacturing tolerances, a loose fit is provided which allows for scooping and cocking action of the plug shell relative to the receptacle shell. The resilient lip 30 is operative to maintain an effective seal irrespective of such cocking and scooping actions.

It is noted that the root portion 31 is firmly supported within the receptacle shell 15, and an inwardly extending annular portion 45 of the receptacle shell 15 being provided between the root portion 31 and the insert 25.

It will be understood that modifications and variations may be effected without departing from the spirit and scope of the novel concepts of this invention.

I claim as my invention:

1. In an electrical connector, first and second members adapted to be connected together, said first member having an annular surface portion and said second member having a rigid annular edge, and a seal member including an annular redially extending resilient lip including a root portion supported from said first member and an annular free edge, said rigid annular edge of said second member being engageable with said lip at a point between said root portion and said free edge to urge said free edge into pressure sealing engagement with said annular surface portion of said first member when said first and second members are connected together, said annular surface portion of said first member being generally cylindrical, and said lip extending angularly from said root portion to said free edge and at an acute angle relative to said generally cylindrical annular surface portion.

2. In an electrical connector as defined in claim 1, said first member having an additional annular surface portion of generally frustoconical shape generally parallel to said lip and on the side of said lip opposite the side thereof engaged by said rigid annular edge.

3. In an electrical connector as defined in claim 1, said seal member being of a relatively soft rubber material.

4. In an electrical connector as defined in claim 1, said first and second members having cylindrical surfaces loosely fitted in telescoping relation with predetermined manufacturing tolerances, and said resilient lip being operative to maintain an effective seal irrespective of relative cocking and scooping of said first and second members.

5. In an electrical connector as defined in claim 1, said first and second members when connected together having faces in spaced facing relation and said seal member having a central portion sandwiched and compressed between said faces when said members are connected together, said root portion of said lip being integral with the periphery of said central portion and said free edge being spaced radially outwardly from said root portion.

6. In an electrical connector as defined in claim 5, contacts carried by said first and second members and arranged to meet when said members are connected together, said central portion of said seal member having openings for passage of said contacts therethrough and for sealing engagement therewith.

7. In an electrical connector as defined in claim 1, said first member being in the form of a receptacle and said annular surface portion being a generally cylindrical internal surface, said second member being in the form of a plug and said rigid annular edge being defined by the intersection between an end face of said plug and a generally cylindrical outer surface of said plug.

8. In an electrical connector as defined in claim 7, said first member having an internal face in spaced facing relation to said end face of said second member when said members are connected together, and said seal member having a central portion sandwiched between said internal face of said first member and said end face of said second member when said members are connected together, said root portion of said lip being integral with the periphery of said central portion with said free edge being spaced radially outwardly from said root portion.

9. In an electrical connector as defined in claim 8, said seal member having an annular slot at the juncture between said root portion and said periphery of said central portion to increase the flexibility of said lip.

* * * * *